No. 897,587. PATENTED SEPT. 1, 1908.
G. H. CLARK.
LASTING MACHINE.
APPLICATION FILED OCT. 22, 1906.

4 SHEETS—SHEET 1.

WITNESSES,
Howard Hanscom
May A. Kenney

INVENTOR,
George H. Clark.
By his Attorney,
C. Hart Anderson

No. 897,587. PATENTED SEPT. 1, 1908.
G. H. CLARK.
LASTING MACHINE.
APPLICATION FILED OCT. 22, 1906.

4 SHEETS—SHEET 2.

WITNESSES,
Howard Hanscom
May A. Kenney

INVENTOR,
Geo. H. Clark.
By his Attorney,
Albert Anderson

No. 897,587.

PATENTED SEPT. 1, 1908.

G. H. CLARK.
LASTING MACHINE.
APPLICATION FILED OCT. 22, 1906.

4 SHEETS—SHEET 3.

WITNESSES,
Howard Hanson
May A. Kenney

INVENTOR,
George H. Clark,
By his Attorney,
Mark Anderson

No. 897,587. PATENTED SEPT. 1, 1908.
G. H. CLARK.
LASTING MACHINE.
APPLICATION FILED OCT. 22, 1906.
4 SHEETS—SHEET 4.
FIG. 8
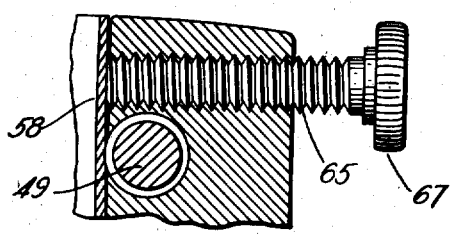
FIG. 9
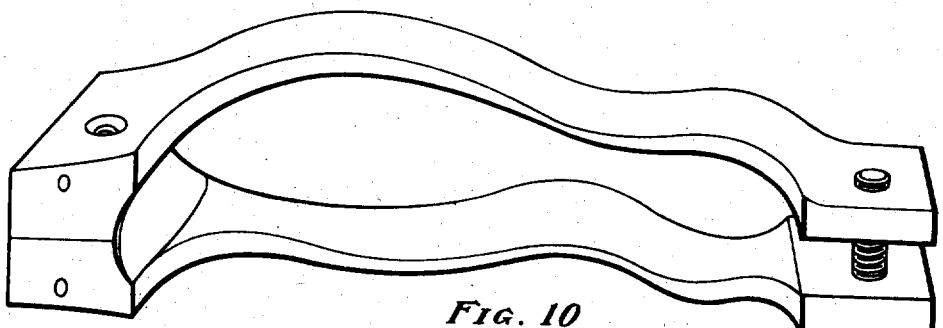
FIG. 10
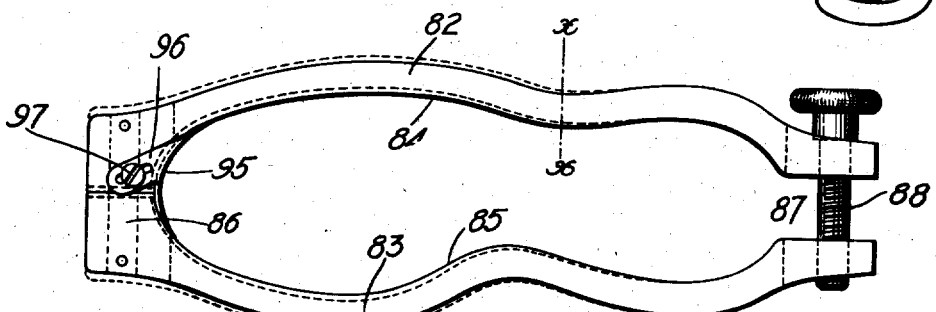
FIG. 11
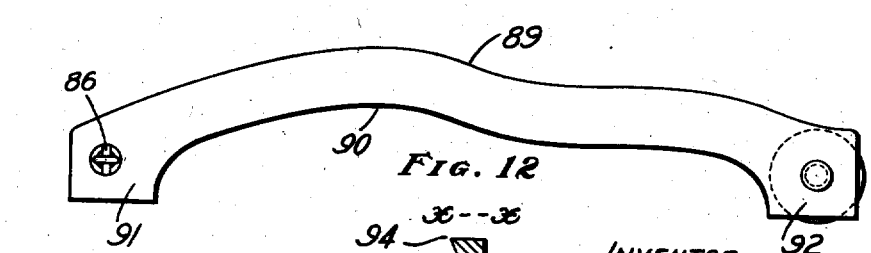
FIG. 12
FIG. 13
WITNESSES,
Howard Hanscom
May A. Kenney
INVENTOR,
George H. Clark,
By his Attorney,
Albert Anderson dd
UNITED STATES PATENT OFFICE.

GEORGE H. CLARK, OF ALLSTON, MASSACHUSETTS.

LASTING-MACHINE.

No. 897,587.  Specification of Letters Patent.  Patented Sept. 1, 1908.

Application filed October 22, 1906. Serial No. 339,985.

*To all whom it may concern:*

Be it known that I, GEORGE H. CLARK, a citizen of the United States, residing at Allston, in the county of Suffolk and State of Massachusetts, have invented certain new and useful Improvements in Lasting - Machines; and I do hereby declare the following to be a full, clear, and exact description of the invention, such as will enable others skilled in the art to which it appertains to make and use the same.

The present invention relates to machines for lasting boots and shoes and more particularly to means for shaping and holding the uppers to the last pending the permanent uniting of the soles and uppers.

The invention has for its object to produce a simple and effective clamp form for receiving the last and upper and so constructed as to yieldingly clamp the upper about the last and to hold it in the position to which it may have been drawn by the lasting pincers while the upper and sole are being united.

A further object of the invention is to provide a simple stand or jack for the lasting clamp or form for supporting the last with the upper thereon, and also the form in proper relation to the upper and bottom of the last during the operation of drawing the upper tightly about the last.

Further objects of the invention will appear in the following description of the construction, organization and mode of operation of my invention.

To the above ends my invention consists of the devices and combinations of devices which will be hereinafter described and claimed.

The present invention is illustrated in the accompanying drawings in which:—

Figures 1, 14:
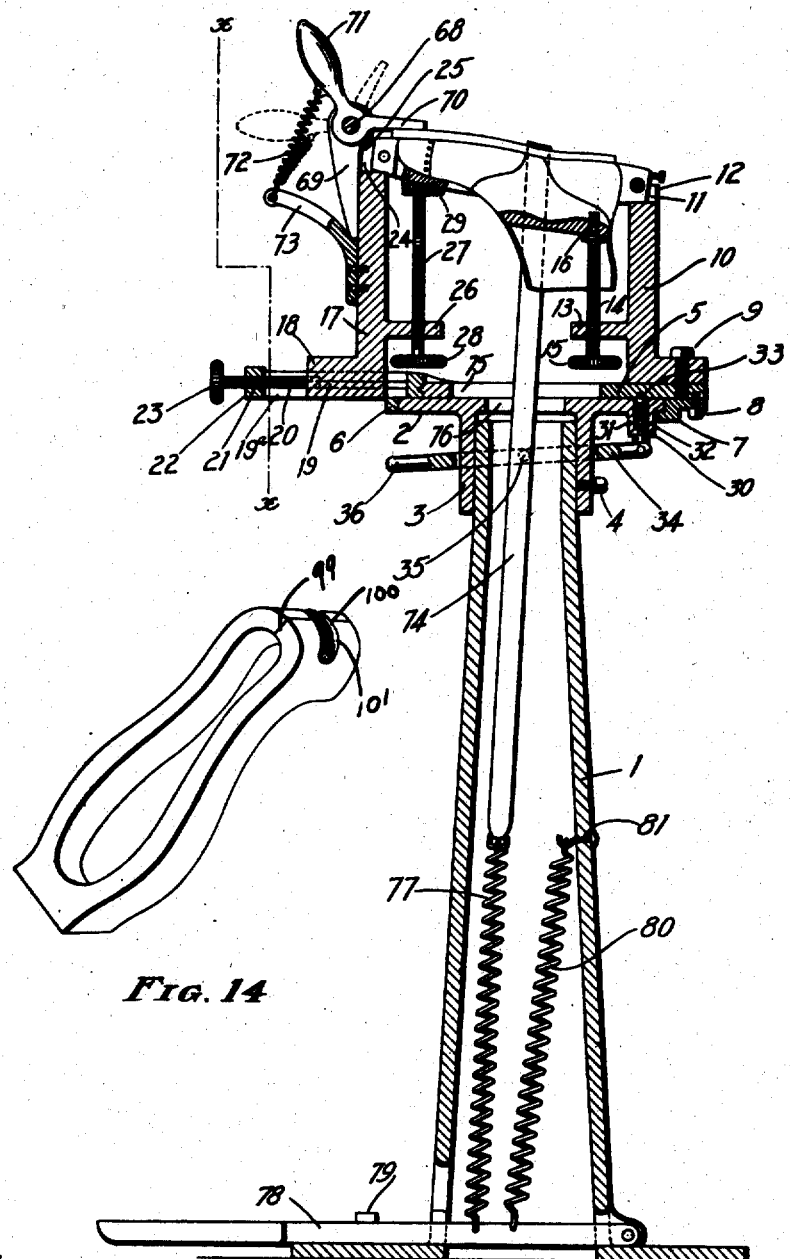
Figure 2:
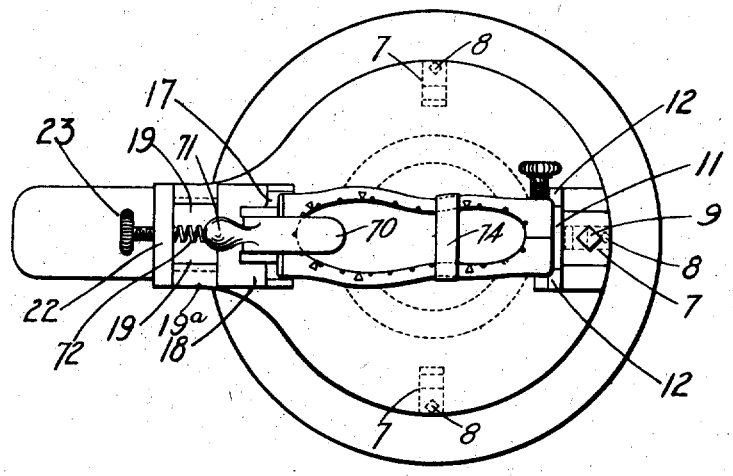
Figure 3:
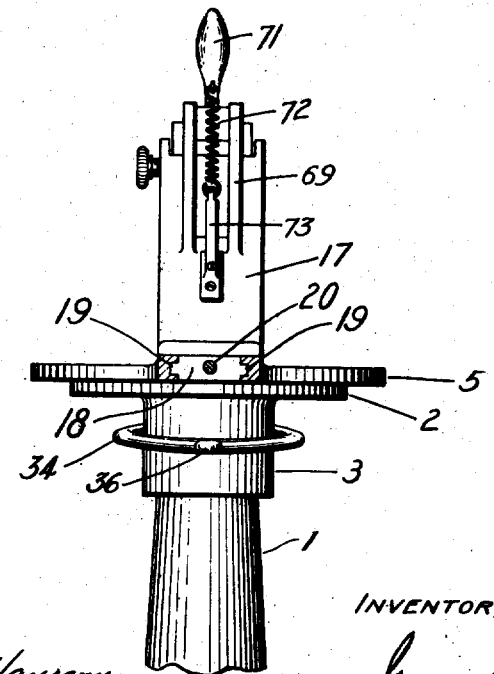
Figure 4:
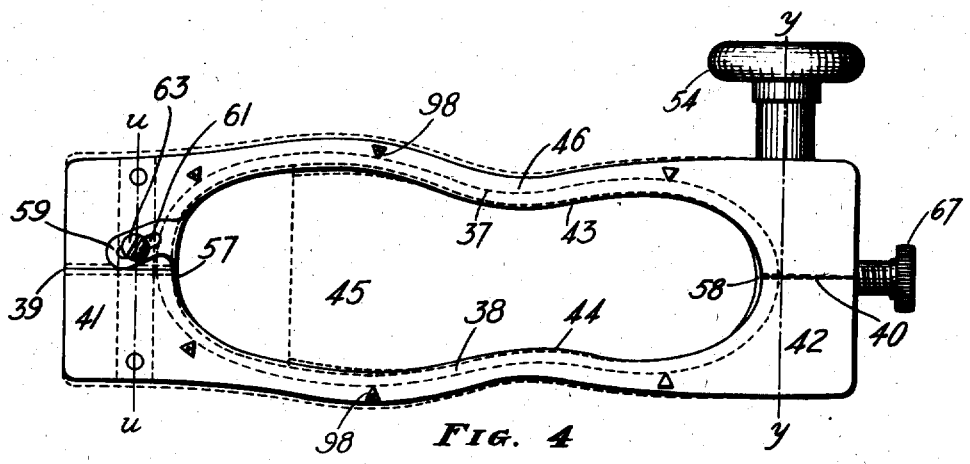
Figure 5:
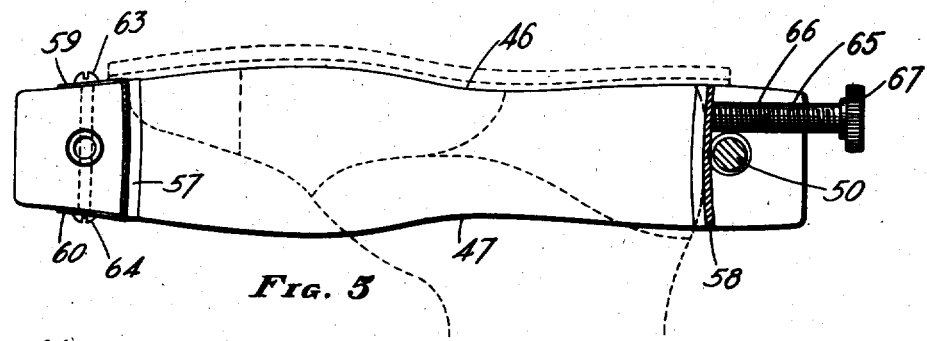
Figure 6:
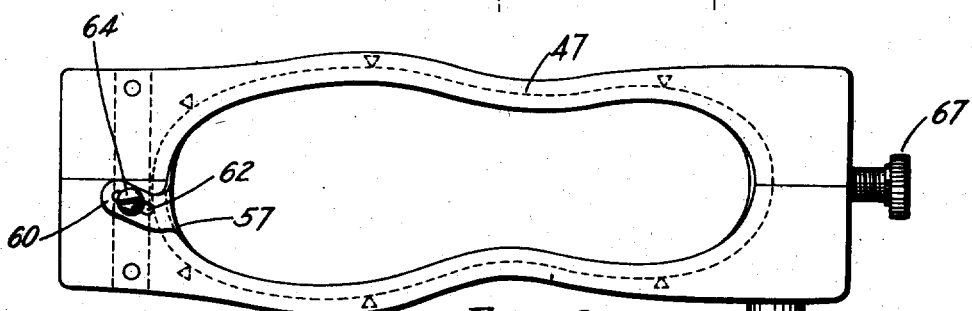
Figure 7:
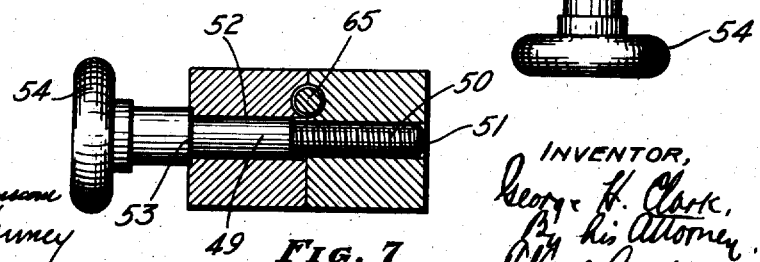

Figure 1 shows a vertical sectional view through the machine showing a lasted shoe in the clamping form. Fig. 2 shows a top plan view of the machine with the clamping form in position but the shoe removed. Fig. 3 shows a vertical sectional view on the line $x$—$x$, Fig. 1. Fig. 4 shows a plan view of one of the clamping forms. Fig. 5 shows a longitudinal sectional view of the clamping form and showing in dotted lines the shoe therein. Fig. 6 shows a view the reverse of Fig. 4. Fig. 7 shows a cross sectional view taken on the line $y$—$y$ in Fig. 4. Fig. 8 shows a cross section taken on the line $u$—$u$, in Fig. 4. Fig. 9 shows an enlarged vertical section through the heel portion. Fig. 10 shows in perspective a modified form of the clamping form. Fig. 11 shows a plan view of the device shown in Fig. 10. Fig. 12 shows the form shown in Figs. 10 and 11, in side elevation. Fig. 13 shows a cross section of one of the sides of the form shown in Figs. 10, 11 and 12, taken on the dotted line $x$—$x$ in Fig. 11. Fig. 14 shows a perspective view of a modified form of clamping form.

Similar reference characters will be employed throughout the specification and drawings to designate corresponding parts of the device.

In the drawings 1 indicates a standard or column which may be of any suitable height and may stand upon the floor, (as shown) or upon a bench or table. Upon the standard 1 is adjustably secured a table 2, preferably circular in form and which upon its under side is provided with a tubular socket 3, which is fitted over the upper end of the standard 1 and is held thereto by a set screw 4.

Mounted upon the table 2 is a circular turn-table 5 which upon its under surface is provided with a segmental flange 6 engaging the edge of the table 2 and with a removable segmental flanged plate 7, which engages and extends beneath the edge of the table 2, and is held to the under side of the turn-table 5 by means of screws 8, one only being shown, (see Fig. 1).

Upon the turn-table 5 there is mounted by means of a bolt 9, a vertical stand 10, which at its upper end is provided with a seat 11 and the lugs 12 which support the heel end of the clamping form, as will be explained. The stand 10 carries a bracket 13 in which is fitted the threaded spindle 14 having at its lower end a hand wheel 15 and at its upper end the last pin and rest 16. Also supported upon the turn-table 5 and at a point diametrically opposite to the stand 10 there is a stand 17 which at its lower end is provided with a guide foot 18 fitting guides 19 formed in a radial projection 19ᵃ of the turn-table 5. The guide foot 18 is longitudinally movable along the guide 19, so as to move the stand 17 radially with relation to the turn table 5 and towards and from the stand 10 for a purpose to be hereinafter set forth, and this movement is accomplished and the stand 17 held in the position to which it may be moved by the threaded rod 20 having its inner end swiveled to the foot 18 and seated in a threaded bearing 21 in a cross piece 22 and provided with a head 23.

At its upper end the stand 17 is provided with a seat 24 and the lugs 25 to receive and support the opposite end or the toe portion of the clamping form, and it will be obvious that the adjustment of the stand 17 with relation to the stand 10 is for the purpose of accommodating the machine to the varying lengths of clamping forms and with varying sizes of shoes and lasts. Like the stand 10, the stand 17 is provided with a bracket 26 in which is fitted a threaded spindle 27, which at its lower end is provided with a hand wheel 28 and at its upper end carries a swiveled toe rest 29 upon which the toe of the shoe rests as shown in Fig. 1.

In the lasting operation it is required that the shoe be turned about a vertical axis so as to bring the heel or toe as desired in front of the operator, and this can be done by turning the turn-table 5 upon which the standards 10 and 17 and the shoe and last is supported, and for the purpose of holding the turn-table in a fixed position with either the toe or the heel in position to be operated upon there is provided a latch, consisting of a bolt 30 seated in and vertically movable in a bearing 31 of the table 2 and surrounded in said bearing by a spring 32 which normally raises the bolt 30 and forces its upper end into a socket 33 in the under face of the turn-table 5. There will be a corresponding socket in the under surface of the turn-table 5 at a point diametrically opposite the socket 33 and there may be others between these if desired. The lower end of the bolt 30 is pivotally connected to one end of a lever 34, which encircles and is pivotally connected at 35 to the standard 1, and at the front provided with a handle 36 whereby the lever may be rocked to pull down the bolt 30 against the tension of the spring 32 to release the turn-table 5 to permit said turn-table and the parts supported thereon to be turned as required.

In the lasting of shoes in my machine, the last with the upper loosely fitted thereto is forced downwardly into a clamping form the recess or opening in which is of a size and outline corresponding to the size and shape of the last at its widest part, and which fits closely against the surface of the last, pressing and clamping the upper closely thereto and is preferably elastic or capable of spreading slightly laterally; thus as the last and upper is forced into the clamping form the upper will be frictionally engaged by the form and the last forced into the upper. After fitting the last and upper into the clamping form, the edge of the upper which projects above the clamping form may be forcibly drawn upward by hand pincers or other means and either turned outward upon the surface of the clamping form as in lasting so-called "stitch down" shoes, in which event the clamping form forms a support for the out-turned edge of the upper, or the edge of the upper may be turned inward upon the sole or insole, in the usual manner of lasting turn shoes and McKay and welted shoes.

It is intended that the upper and last shall be retained in the clamping form in lasted condition during the attaching of the upper and sole permanently, and therefore the clamping form will be provided with means whereby it may be forcibly caused to clamp the upper against the sides and ends of the last.

In Figs. 4 to 9 inclusive there is illustrated one type of my clamping form, comprising the two members 37 and 38 fitted together upon the meeting lines 39 and 40 at the ends 41 and 42. The member 37 has a shaping and clamping surface 43 shaped to fit substantially one-half of the last and the member 38 has a corresponding surface 44 and when the two members are fitted together they inclose a substantially sole shaped recess 45 of the size of the last and of the shape of the bottom thereof. The upper and lower surfaces 46 and 47 of the clamping form now being described will be formed upon the compound curves as shown, whereby to conform to the outward curve of the forepart of the bottom of the last and the inward or concaved portion of the last. In this type of clamping form it will be observed that a single form can be used in lasting both right and left shoes by simply reversing it to bring either surface uppermost, as an inspection of Figs. 4 and 6 of the drawing will show. At the end 41, which is the toe end of the clamping form, the two parts are yieldingly held together by means of a spring 48, which is received within a bore or chamber 49 formed in the end portions 41 and fastened at its opposite ends respectively by means of the pins 50 and 51 to the respective members of the clamping form. By this construction the members of the clamping form are drawn towards each other at the end 41 and may yield slightly as the last and upper are forced therein.

After the upper and its contained last have been forced into the clamping form and the edge of the upper pulled up all around to cause it to hug snugly and to conform to the last, the upper and last will be forcibly clamped by the clamping form, so that the said form and the contained upper and last may be removed from the machine and taken to the machine for uniting the upper and sole. For the purpose of clamping, the clamping form at the end 42 is provided with a bolt 49 having a threaded end 50 engaging a threaded socket 51 in one of the members and turning freely in a bore 52 in the other member and provided with a shoulder 53 which bears against the outer surface of said member and is provided with a head 54 whereby it may be turned to cause the clamp members to forcibly engage the sides of the last. In order to prevent the marring of the uppers of the shoes, this type of my invention will be provided with shields 57 and 58 located upon the inside of the toe and heel respectively and covering the joints where the parts meet upon the lines 39 and 40, thus presenting a smooth and unbroken surface to bear against the upper and preventing it from becoming pinched as the members are forced into clamping condition.
The shields may be made of any suitable material, but preferably metal, and the shield 57 will have segmental tongues 59 and 60 extending above and below the end 41 of one member of the form, and provided with segmental slots 61 and 62 receiving the headed screws 63 and 64, which loosely hold the shield, and permitting it to shift slightly to conform to the end of the last.

As shown in Fig. 4, this shield extends about the inner face of the toe end 41 each side of the joint 39. The shield 58 consists of a curved piece fitted into the form at the heel end 42 and covering the joint 40 and as shown in Figs. 4, 5, 6, 7 and 9 there is provided a clamping bolt 65 fitting a threaded bearing 66 formed in the meeting faces of the end 42 of the members, and which bears at its inner end on the shield 58 and is provided with a head 67 whereby it may be turned to force the shield 58 into forcible clamping contact with the heel end of the last, thus applying an end pressure to the upper and last as well as a side pressure, insuring that the clamping form will fixedly hold the upper to the last and prevent its movement during the operation of attaching the sole.

It will be noted from an inspection of Figs. 1 and 5 that the shoe and last are forced into the clamping form to a point sufficient to bring the bottom of the last in the plane of the surface of the clamping form which may be uppermost, and that said surface will conform in contour to the surface of the bottom of the last. Thus the surface of the clamping form will serve the purpose of a rest or support, which in lasting "stitch down" shoes will support the outturned edge of the upper and will also support the outsole which may be positioned and temporarily secured to the lasted shoe before the shoe is removed from the machine, and thus the machine acts as a sole laying machine so-called as well as a lasting machine.

For forcing the last downwardly at the toe portion, I have provided a lever pivoted at 68 to a bracket 69 supported by the stand 17. This lever has a pressing foot 70 and a handle 71, whereby it may be rocked about its fulcrum to bring its pressing foot into engagement with the toe of the last and to apply pressure thereto, or whereby it may be caused to assume a position as shown in dotted lines Fig. 1 out of the way, which position it will be caused to assume by means of a spring 72, one end of which is connected to the handle 71 and the other end to a bracket 73 fastened to the stand 17. As shown in Fig. 1, this lever and its pressing foot is also used in the sole laying operation, by causing its foot 70 to engage the outersole S of the shoe and forcibly clamping it against the bottom of the last at the toe.

In order to further secure the holding of the last and the clamping form during the lasting and sole laying operations the machine may be provided with a doubled belt or strap 74, which may engage the last and shoe at the shank portion, as shown, and which passes down through openings 75 and 76 formed at the center of the turn-table 5 and the table 2 and connected at its lower ends with a spring 77 which in turn is connected with a foot treadle 78. By pressing down upon the foot treadle 78 the strap 74 will be caused to yieldingly bind the shoe and last and prevent their accidental displacement. A hooked arm or latch 79 may be provided at the base of the standard 1 beneath which the foot treadle may be placed, thus relieving the operator of the necessity of holding the treadle down. A spring 80 connected to the standard 1 by means of a hook 81 and at its lower end connected to the foot treadle 78 may be provided to raise the foot treadle and keep it normally elevated.

In Figs. 10, 11, 12 and 13 is shown a clamping form of a modified type and comprises two members 82 and 83 each having an inner face 84 and 85 approximating one-half of the outline of the bottom of the last. The members 82 and 83 are united at the toe end by means of a spring 86 in the same manner as the members 46 and 47 are united and at the heel end the members 82 and 83 are spaced apart as shown at 87, and connected by means of the threaded bolt 88 in the same manner as the members 46 and 47 are connected. Unlike the members 46 and 47, the members 82 and 83 have but one surface, 89, following the vertical contour of the bottom of the last, and are cut away underneath as shown at 90 and at each end will have the downwardly extending rests 91 and 92, which rest upon the standards 10 and 17; thus this clamping form can only be used with either a right or a left shoe as the case may be, (unless made for straight shoes). As shown in Fig. 13, the sides of the clamping form will be provided with the inclined clamping face 93 and the sharp edge 94 which will engage the upper close to the bottom of the last. Like the clamping form first described, this form may be provided with a shield 95 which is attached and positioned like the shield 57, except that it has only one segmental tongue 96, held by a screw 97.

The clamping forms may be made of any suitable material, preferably wood, and it is obvious that the forms may be made in a single piece of wood or other material united integrally at one end, preferably at the toe, and divided at the other end.

In the operation of my machine, the upper will be fitted to the last and the last and upper will be placed in the clamping form. The machine having been properly adjusted for the length of form being used, said form will be placed in the machine and supported upon the rests 11 and 24 as shown in Fig. 1, and the last will be depressed until the heel end is supported by the pin 16 and the forward end by the toe rest 29. As the last is forced down, the upper is drawn up because of the frictional contact of the clamping form therewith, and after the last has been properly positioned the edge of the upper as it projects above the bottom of the last and the clamping form will be engaged by pincers and drawn up tightly about the last, removing the stretch and causing it to closely conform to the contour of the last, thus shaping and lasting the upper. After the upper has been drawn up as described, the clamping form is tightened by means of the threaded bolts 50 and end pressure is applied longitudinally when using the clamping form first described, by setting up the shield 58 by means of the bolt 65. This causes the upper to be tightly clamped against the sides of the last and along a line close to the bottom of the last.

If the shoes being lasted are "stitch down" shoes, the edge of the upper will be turned outward and rest upon the upper surface of the clamping form, either entirely around the shoe, or along the shank and forepart, the heel portion being turned inward upon the last in the usual manner. The outsole is now laid upon the bottom of the last and the out-turned edge of the upper, which has previously been coated with cement and is pounded and pressed into close contact, so that the edge of the upper will adhere to the sole. After the same has set for a sufficient length of time, the shoe and the clamping form and the contained last is removed from the machine and taken to a sewing machine which unites the sole and the out-turned edge of the upper and the shoe is then finished in any of the well known ways.

In case of lasting a McKay shoe, the inner sole will be laid upon the bottom of the last and the edge of the upper turned over and cemented to the insole and the outsole laid upon and cemented to the insole and the edge of the upper. In the case of a turn shoe, the sole will be laid upon the last with its tread surface in contact with the bottom of the last and the channeled surface uppermost, and the edge of the upper will be laid over and cemented to the channeled surface of the sole. In the case of a welted shoe, the insole will be laid upon the bottom of the last and the edge of the upper turned over and cemented to the insole with its edge laid against the shoulder or channel, after which the welt is secured to the edge of the upper and to the insole and the outsole to the welt, in the usual manner of making welt shoes. In every case it will be noted that the lasting of the shoe is accomplished without the use of tacks. If desired the surface of the clamping forms may be provided with guide points 98, surrounding the opening 45 for the purpose of assisting in the positioning of the sole.

In the modification shown in Fig. 14, the clamping form is made of a single piece, preferably of wood, divided as shown at 99 and held yieldingly at the divided end by a coiled spring 100 seated in a recess 101 and fastened at each end to the respective members of the form.

Having described my invention I claim as new and desire to protect by Letters Patent of the United States:—

1. In a lasting machine, a clamping form comprising laterally yielding members inclosing a sole shaped recess, a spring connecting the members at one end and a threaded bolt connecting the members at the opposite end, substantially as described.

2. In a lasting machine, a clamping form comprising laterally yielding members inclosing a sole shaped recess and jointed together at its opposite ends, means for laterally drawing the members towards each other and clamping the same about the upper and last, a shield covering the joint at one of the ends of the member and means for forcing the shield in contact with the end of the upper and last.

3. In a lasting machine, a clamping form comprising laterally yielding members inclosing a sole shaped recess and having its upper surfaces shaped to the contour of the bottom of the last and provided with beveled clamping faces, substantially as described.

In testimony whereof I affix my signature, in presence of two witnesses.

GEORGE H. CLARK.

Witnesses:
 T. HART ANDERSON,
 MARY A. KENNEY.